US010009647B2

(12) United States Patent
Raveendran

(10) Patent No.: US 10,009,647 B2
(45) Date of Patent: Jun. 26, 2018

(54) REDUCING END-TO-END LATENCY FOR COMMUNICATING INFORMATION FROM A USER DEVICE TO A RECEIVING DEVICE VIA TELEVISION WHITE SPACE

(75) Inventor: Vijayalakshmi R. Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 577 days.

(21) Appl. No.: 13/038,323

(22) Filed: Mar. 1, 2011

(65) Prior Publication Data
US 2011/0216239 A1 Sep. 8, 2011

Related U.S. Application Data

(60) Provisional application No. 61/309,658, filed on Mar. 2, 2010.

(51) Int. Cl.
*H04N 21/235* (2011.01)
*H04N 21/41* (2011.01)
(Continued)

(52) U.S. Cl.
CPC ... *H04N 21/440218* (2013.01); *H04N 21/235* (2013.01); *H04N 21/4122* (2013.01);
(Continued)

(58) Field of Classification Search
None
See application file for complete search history.

(56) References Cited

U.S. PATENT DOCUMENTS 8,031,807 B2 10/2011 Shellhammer
8,358,665 B2 1/2013 Raveendran
(Continued)

FOREIGN PATENT DOCUMENTS

CN 101075820 A 11/2007
EP 1307062 5/2003
(Continued)

OTHER PUBLICATIONS

ISO/IEC 13818-6 (MPEG-2 Part 6) Digital Storage Media Command and Control (DSM-CC), Dec. 6, 1995, pp. 485.
(Continued)

*Primary Examiner* — Joseph Ustaris
*Assistant Examiner* — William Adrovel
(74) *Attorney, Agent, or Firm* — Kilpatrick Townsend & Stockton

(57) ABSTRACT

A system transmits human interface data (HID) as ancillary data to a television receiver over white space. Content on a user mobile device may be wirelessly displayed on an external display device. It may be desirable to have user interactions with the mobile device (such as controls for video games) displayed on the external display device in a manner that does not suffer from the latency of standard video being set to the display device. The HID may be captured and processed separately from the video data. The HID may be formed into a transport stream for transmission over white space. The HID may be included as ancillary data in the transport stream. Timestamps may be used to coordinate the transmission of the HID as well as its processing when received by a television receiver.

23 Claims, 8 Drawing Sheets

(51) Int. Cl.
    *H04N 21/435*    (2011.01)
    *H04L 5/00*      (2006.01)
    *H04N 21/4402*   (2011.01)
    *H04N 21/4363*   (2011.01)
    *H04N 21/438*    (2011.01)
    *H04N 21/485*    (2011.01)

(52) U.S. Cl.
    CPC ....... *H04N 21/435* (2013.01); *H04N 21/4381* (2013.01); *H04N 21/43637* (2013.01); *H04N 21/4858* (2013.01); *G09G 2370/06* (2013.01); *G09G 2370/16* (2013.01); *H04L 5/003* (2013.01)

(56) References Cited

U.S. PATENT DOCUMENTS

| | | | |
|---|---|---|---|
| 2003/0208759 A1* | 11/2003 | Gordon | H04N 5/44543 725/46 |
| 2005/0008074 A1 | 1/2005 | Van Beek et al. | |
| 2005/0036557 A1* | 2/2005 | Balakrishnan | H04N 21/23424 375/240.28 |
| 2007/0271525 A1 | 11/2007 | Han et al. | |
| 2008/0089306 A1 | 4/2008 | Hu | |
| 2010/0124254 A1 | 5/2010 | Wu et al. | |
| 2010/0138780 A1* | 6/2010 | Marano | G06F 3/1415 715/804 |
| 2010/0218207 A1* | 8/2010 | Jagmag | 725/25 |

FOREIGN PATENT DOCUMENTS

| | | |
|---|---|---|
| EP | 1858238 A2 | 11/2007 |
| JP | 2000300849 A | 10/2000 |
| JP | 2012509608 A | 4/2012 |
| KR | 20070111592 A | 11/2007 |
| KR | 20110089262 A | 8/2011 |
| WO | WO0072596 A1 | 11/2000 |
| WO | WO-2008061044 A2 | 5/2008 |
| WO | WO2009125061 A1 | 10/2009 |
| WO | 2010019720 A1 | 2/2010 |
| WO | 2010057302 A1 | 5/2010 |

OTHER PUBLICATIONS

Liu et al., "Wireless Digital Home Networking Based on Cognitive Radio", School of Electronic and Information Engineering, South China University of Technology, 510640, China, 4 pages.
Kumar et al., "A Case Study of QoS Provisioning in TV-band Cognitive Radio Networks", 6 pages.
Murroni et al., "Cognitive Radio HDTV Multi-Vision System in the 700 MHz UHF TV Band", 3 pages.
International Search Report and Written Opinion—PCT/US2011/026902—ISA/EPO—dated May 23, 2011.
Kawade S., et al., "Can Cognitive Radio Access to TV White Spaces Support Future Home Networks?", New Frontiers in Dynamic Spectrum, 2010 IEEE Symposium ON, IEEE, Piscataway, NJ, USA, Apr. 6, 2010 (Apr. 6, 2010), pp. 1-8, XP031664884, ISBN: 978-1-4244-5189-0.
Meinrath S.D., et al., "Unlicensed White Space Device Operations on the TV Band and the Myth of Harmful Interference", Wireless Future Program of New America Foundation, XX, US, Apr. 1, 2008 (Apr. 1, 2008), pp. 1-13, XP008152626, Retrieved from the Internet: URL:http://www.newamerica.net/files/WSDBackgrounder.pdf.
Mueck M., et al., "TV White Space standardization and regulation in Europe", Wireless Communication, Vehicular Technology, Information Theory and Aerospace & Electronic Systems Technology (Wireless Vitae), 2011 2nd International Conference on, IEEE, Feb. 28, 2011 (Feb. 28, 2011), pp. 1-5, XP031998304, DOI: 10.1109/WIRELESSVITAE.2011.5940837 ISBN: 978-1-4577-0786-5.

\* cited by examiner

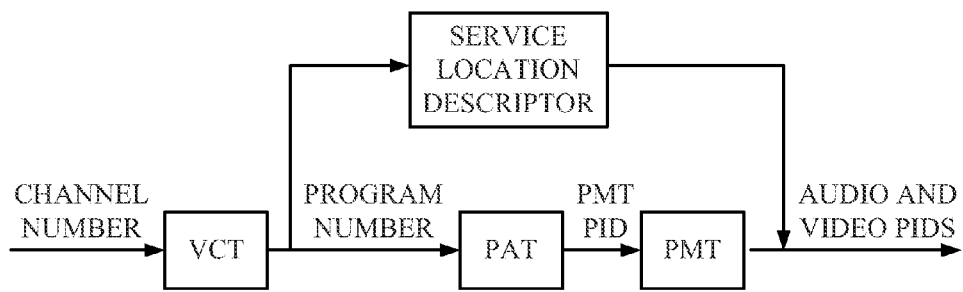

- Each ATSC "channel" corresponds to an MPEG-2 "program."
- The Program Association Table provides the PID of the Program Map Table for each program in a transport stream.
- The Program Association Table is transmitted as the only table on a well known PID (PID zero).
- The Program Map Table defines the PIDs for each elementary stream associated with a program.
- Multiple audio streams may be defined. The receiver should check for a language descriptor.
- If the viewer changes language preferences, the PMT should be re-parsed to check for a matching audio elementary stream.

FIG. 4

REDUCING END-TO-END LATENCY FOR COMMUNICATING INFORMATION FROM A USER DEVICE TO A RECEIVING DEVICE VIA TELEVISION WHITE SPACE

CROSS REFERENCE TO RELATED APPLICATION

This application claims the benefit of U.S. provisional patent application No. 61/309,658 filed Mar. 2, 2010, in the name of RAVEENDRAN, the disclosure of which is expressly incorporated herein by reference in its entirety.

BACKGROUND

Field

The present disclosure generally relates to communication of information from a user device to a receiving device via television white space and, more specifically, to systems and methods for reducing end-to-end latency for such communication.

Background

Wireless delivery of content to televisions (TVs) and other monitors is desirable. As one example, it may be desirable, in some instances, to have content delivered from a user device for output on a TV device. For instance, as compared with many TV device output capabilities, many portable user devices, such as mobile telephones, personal data assistants (PDAs), media player devices (e.g., APPLE IPOD devices, other MP3 player devices, etc.), laptop computers, notebook computers, etc., have limited/constrained output capabilities, such as small display size, etc. A user desiring, for instance, to view a video on a portable user device may gain an improved audiovisual experience if the video content were delivered for output on a TV device. Accordingly, a user may desire in some instances to deliver the content from a user device for output on a monitor with an ATSC tuner (e.g., HDTV device) for an improved audiovisual experience in receiving (viewing and/or hearing) the content.

SUMMARY

A method is offered. The method includes capturing, by a white space device in communication with a television receiver, information from a user input device. The method also includes processing, by the white space device, the captured information to form a transport stream for transmission over white space to the television receiver, at least a portion of the captured information being included as ancillary data within the transport stream. The method further includes transmitting, from the white space device, the transport stream over white space to the television receiver.

An apparatus is offered. The apparatus includes means for capturing information from a user input device. The apparatus also includes means for processing the captured information to form a transport stream for transmission over white space to a television receiver, at least a portion of the captured information being included as ancillary data within the transport stream. The apparatus further includes means for transmitting the transport stream over white space to the television receiver.

A computer program product is offered. The computer program product includes a computer-readable medium having program code recorded thereon. The program code includes program code to capture information from a user input device. The program code also includes program code to process the captured information to form a transport stream for transmission over white space to a television receiver, at least a portion of the captured information being included as ancillary data within the transport stream. The program code further includes program code to transmit the transport stream over white space to the television receiver.

An apparatus is offered. The apparatus includes a processor(s) and a memory coupled to the processor(s). The processor(s) is configured to capture information from a user input device. The processor(s) is also configured to process the captured information to form a transport stream for transmission over white space to a television receiver, at least a portion of the captured information being included as ancillary data within the transport stream. The processor(s) is further configured to transmit the transport stream over white space to the television receiver.

A system is offered. The system includes a white space device communicatively coupled with a user device for capturing information from the user device. The white space device includes a processor that processes the captured information to form a transport stream for transmission over white space, at least a portion of the captured information being included as ancillary data within the transport stream. The white space device also includes a transmitter that transmits the transport stream over white space.

BRIEF DESCRIPTION OF THE DRAWINGS

For a more complete understanding of the present disclosure, reference is now made to the following description taken in conjunction with the accompanying drawings.

FIG. 4 is an illustration of typical channel association in ATSC.

DETAILED DESCRIPTION

Figure 1:
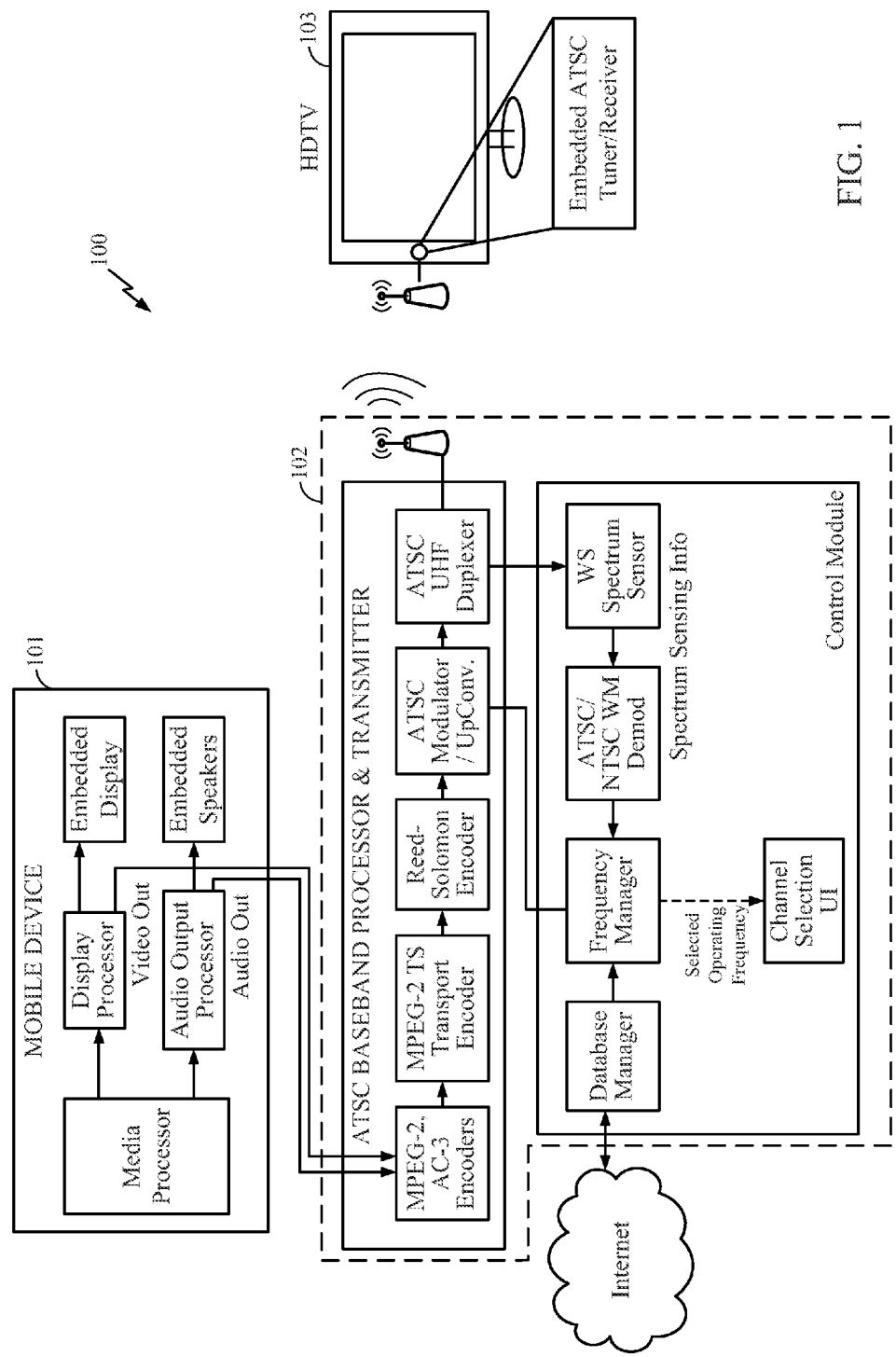
FIG. 1 is an illustration of an exemplary system within which aspects of the present disclosure may be implemented.

The word "exemplary" is used herein to mean "serving as an example, instance, or illustration." Any aspect described herein as "exemplary" is not necessarily to be construed as preferred or advantageous over other aspects.

white space devices generally refer to unlicensed wireless transceivers that communicate over the unused spectrum in the television band. These devices generally operate in a cognitive manner in which the devices scan first to detect TV band signals (e.g., Advanced Television Systems Committee (ATSC), National Television Systems Committee (NTSC), and certain wireless microphone protocols) from licensed primary users and then select unused channels in order to avoid interference with the licensed signals.

A white space device may be communicatively coupled with or integrated within a user device, and the white space device may thus deliver information (e.g., multimedia content) from the user device to a TV device (e.g., a HDTV device) over TV white space. Exemplary implementations of a white space device are described further herein. However, various implementations of such a white space device are possible, and any implementation of a white space device that is operable to deliver information from a user device over white space are within the scope of the present disclosure.

It becomes desirable to reduce end-to-end latency associated with delivery of information from a user device via a white space device to a receiving device (e.g., a HDTV device). Aspects of the present disclosure provide techniques for reducing or minimizing such end-to-end latency. As discussed further below, in certain aspects, ancillary data contained within the wirelessly transmitted stream (i.e., contained in the in-band white space transmission) is used for reducing end-to-end latency associated with transmitting certain information, such as human interface device (HID) information captured from the user device. As an example, mouse movements and/or other user input commands may be communicated efficiently as ancillary data. As discussed further below, ATSC supports MPEG-2 TS (transport stream), which permits ancillary data to be contained in a transmission, and such ancillary data is traditionally employed within ATSC/MPEG-2 TS communications for communicating closed-captioning or subtitles information. Aspects of the present disclosure leverage such ancillary data to communicate information from a user device, such as HID information, efficiently. Thus, rather than merely relying upon transmission as video frame data of HID information, such as a mouse movements, to be displayed on a receiving device's display, such HID information may be more efficiently communicated as ancillary data in accordance with certain aspects of the present disclosure.

The present disclosure describes an exemplary system that includes an exemplary implementation of a white space device. The disclosure also describes an exemplary aspect that utilizes ancillary data contained in a stream transmitted via white space to efficiently communicate certain information from a user device, such as HID information captured from the user device. While an exemplary system and exemplary implementation of a white space device are described for illustrative purposes, it will be appreciated by those of ordinary skill in the art that the concepts described for utilizing ancillary data for reducing latency are not limited in application to such exemplary system/device but may likewise be employed within various other implementations of systems/devices for delivering information from a user device via white space.

FIG. 1 is an illustration of an exemplary system 100 within which aspects of the present disclosure may be implemented. The system 100 includes a user device 101, shown in block-diagram form, which may be referred to as a "host" device. In the illustrated example, the user device 101 is shown as a mobile device, but in other aspects the user device need not be a mobile device. The device 101 may include a media processor, display processor, audio output processor, and may have embedded input/output devices, such as an embedded display and embedded speaker(s). The user device 101 is generally operable to generate content, which may be output via its embedded output devices (e.g., embedded display and speakers). Various types of content are well known in the art for being output on user devices, and any such content may be output on the user device 101 in a given application. For example, a multimedia player application may be executing on user device 101 to output multimedia content (e.g., a television program, movie, etc.). Of course, other content, such as textual content and/or other graphical/image and/or audio content (e.g., emails, web browsing content, video games, word processing content, etc.) may be output in a given application with which a user may be interacting via user device 101.

The user may be inputting information to the user device 101 (e.g., for interacting with an application executing thereon) via one or more human interface input device(s) (not shown in FIG. 1), such as a pointer device (e.g., mouse), joystick, keyboard, touch-screen interface, microphone, etc. In some instance, such user input information may result in some output being generated or modified. For instance, input of a user's mouse movement may result in corresponding movement of a pointer on an output display of the user device. In another example, a user playing a video game may control the game through buttons and/or a touch interface on the user device 101 or through physical manipulation of the user device 101 (e.g., by shaking it, rotating it, etc.). These interactions by the user may alter the location of a pointer, target, carat, or other icon incorporated in the output display.

Also included in the exemplary system 100 is a white space device 102, an exemplary implementation of which is shown in a block-diagram form in FIG. 1. The white space device 102 is communicatively coupled with the user device 101 for receiving information from such user device 101. In one aspect, the white space device 102 is communicatively coupled with the user device 101 via a USB connection, but the white space device 102 and user device 101 may be communicatively coupled in any suitable manner that allows for information from the user device 101 to be captured by the white space device 102 as discussed further herein. For example, the white space device may be communicatively coupled with the user device 101 via another type of wired connection or via a wireless communication connection, such as via wireless USB (WUSB), Bluetooth, 802.11, etc. Alternatively, in certain aspects, the white space device 102 may be integrated/embedded within the user device 101, and thus may be communicatively coupled via an internal communication bus, for example, for capture of information from the user device 101. Thus, in one aspect the user device 101 and white space device 102 may be incorporated into the same physical device.

The white space device 102 captures information from the user device 101. For instance, the captured information includes "payload content" that is to be output via an output device, such as "video out" and "audio out." As discussed further herein, other information may also be captured by the white space device 102 in certain aspects, such as "human interface device" (HID) data, e.g., user-input commands (e.g., mouse movements, joystick movements, keyboard input, touch input, movement input, and/or other commands received via human interface device(s)). The white space device 102 is operable to wirelessly transmit, via white space, information captured from the user device 101, for instance, to allow the content (e.g., multimedia content) captured from the user device 101 to be received and output by a display device 103, shown in FIG. 1 as an HDTV. User input commands may be included in the transmitted data with timing information to provide correspondence with associated audio or video data.

In the illustrated example of FIG. 1, the white space device 102 transmits Advanced Television Systems Committee (ATSC) signals over the air on a white space channel, thereby effectively acting as a television station transmitter. Thus, as shown in block diagram form, the exemplary white space device 102 of FIG. 1 includes an ATSC baseband processor and transmitter. As is known in the art, ATSC is compatible with the well-known MPEG-2 Transport Stream (TS), and thus the exemplary white space device 102 may include an MPEG-2 TS encoder for encoding the captured information from the user device 101 into a MPEG-2 TS stream for wireless transmission via white space.

Figure 2:
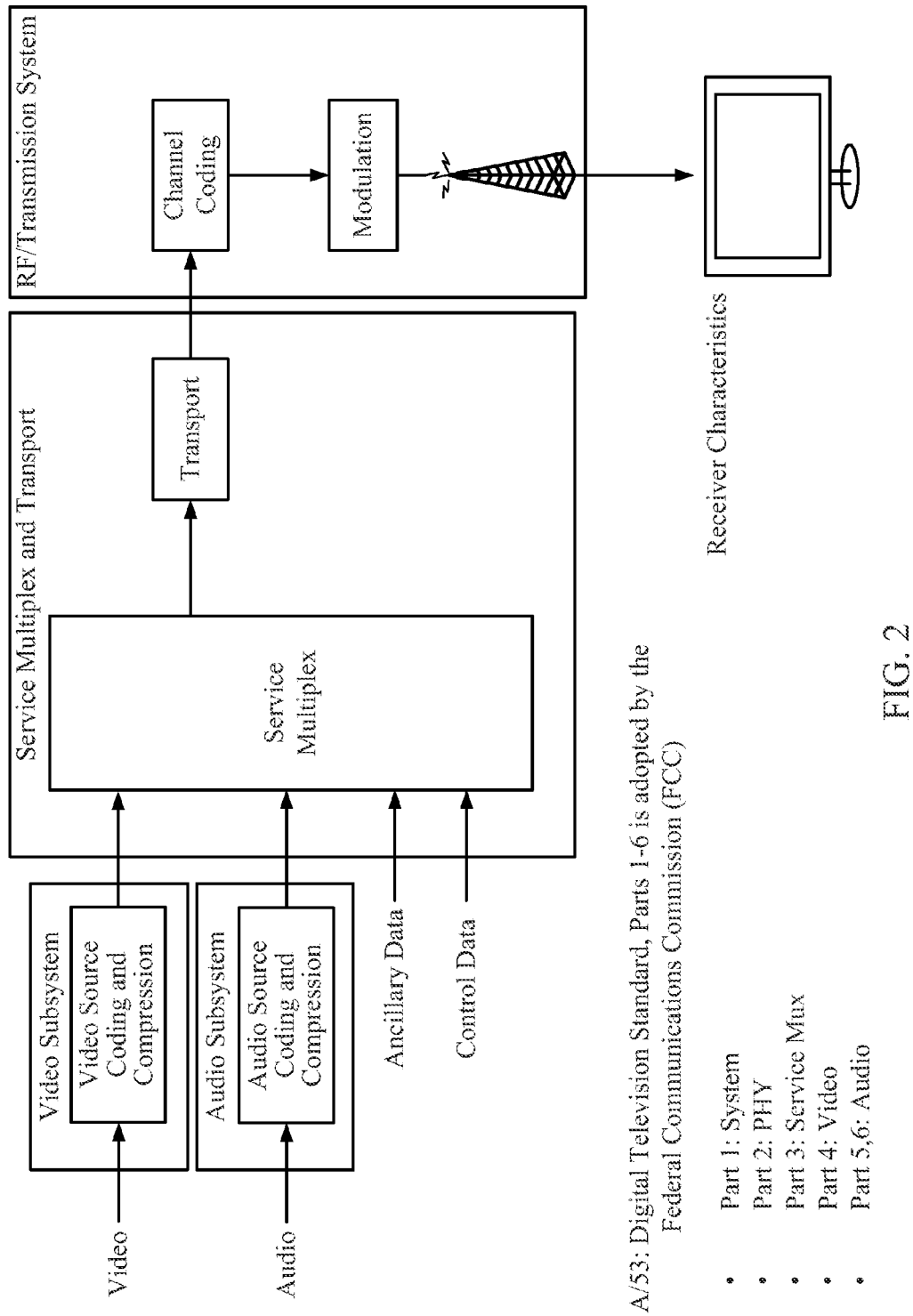
FIG. 2 is an illustration of a typical ATSC system.
Figure 3:
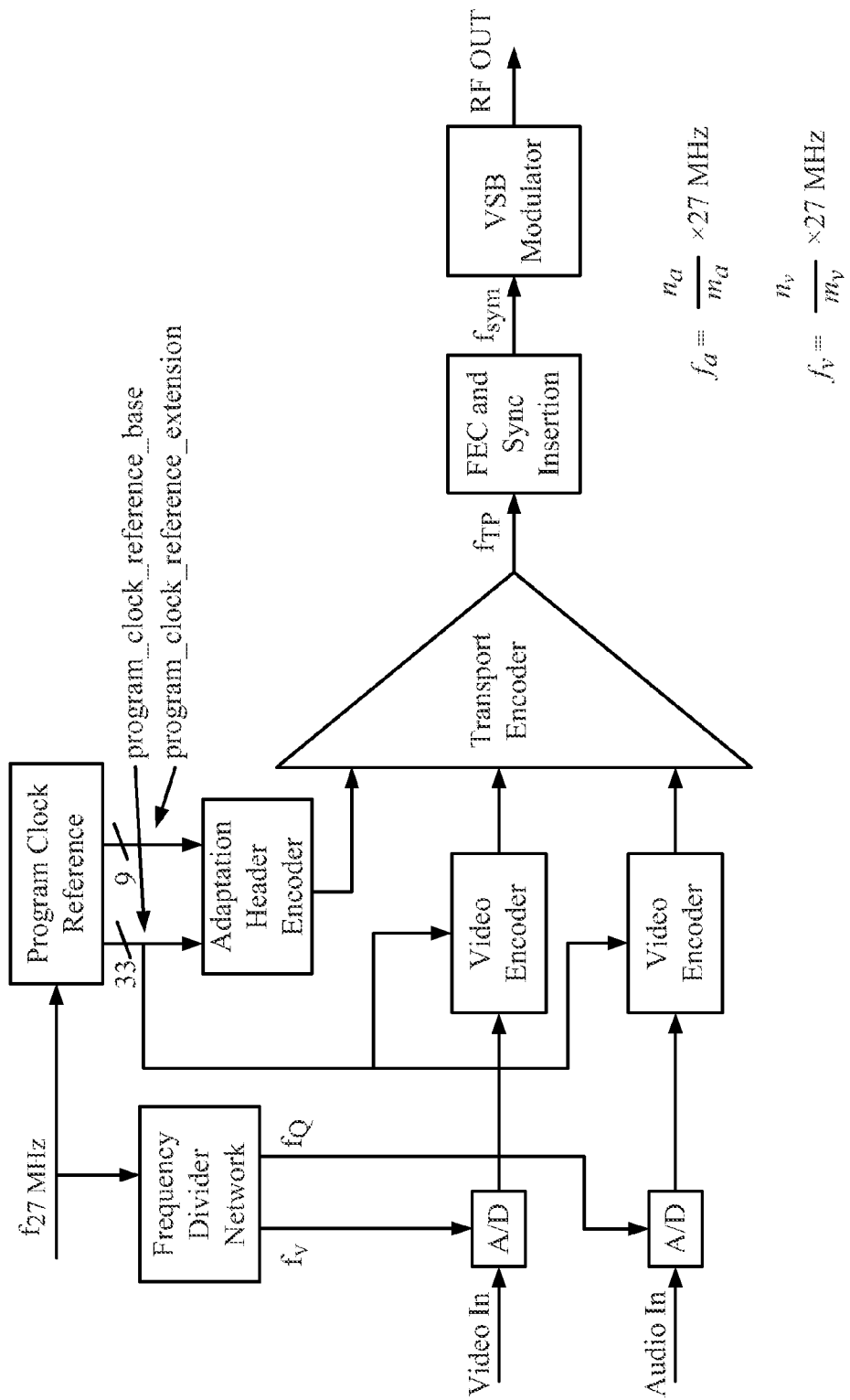
FIG. 3 is an illustration of an exemplary ATSC timing model.

The display device 103 includes an ATSC tuner/receiver (e.g., a conventional television tuner) which may be embedded (as with a standard television) or may be a separate component connected to the display device 103 such that it can receive and process the ATSC signals (e.g., the MPEG-2 TS stream) for output to the display and/or speakers of the display device. ATSC is a well-defined standard, and an exemplary overview of a typical ATSC system and ATSC timing are shown in FIGS. 2-3, respectively. Typical channel association in ATSC is illustrated in FIG. 4. Each ATSC "channel" corresponds to an MPEG-2 "program." The Program Association Table (PAT) provides the Program ID (PID) of the Program Map Table (PMT) for each program in a transport stream. The PAT is transmitted as the only table on a well-known PID (PID zero). The PMT defines the PIDs for each elementary stream associated with a program. Multiple audio streams may be defined. The receiver should check for a language descriptor. If the viewer changes language preferences, the PMT should be re-parsed to check for a matching audio elementary stream. Further details concerning ATSC can be found in the published ATSC standard.

Of course, ATSC is only one example of a set of television transmission standards that may be employed by the white space device 102. In other aspects, any of a variety of television standards, such as ATSC standards, Digital Video Broadcasting (DVB) standards, Integrated Services Digital Broadcasting (ISDB) standards, Digital Multimedia Broadcast (DMB) standards, and the like may be employed to transmit media content over white space using the teachings of this disclosure.

The exemplary white space device 102 further includes a control module that has a white space spectrum sensor for sensing the TV white space (e.g., for sensing channels within the TV band that are not being used by licensed broadcasters). Such sensor may periodically perform sensing to determine available TV white space, and the frequency manager logic may adjust the channel when needed to maintain the white space device's transmission within the determined white space.

Figure 5:
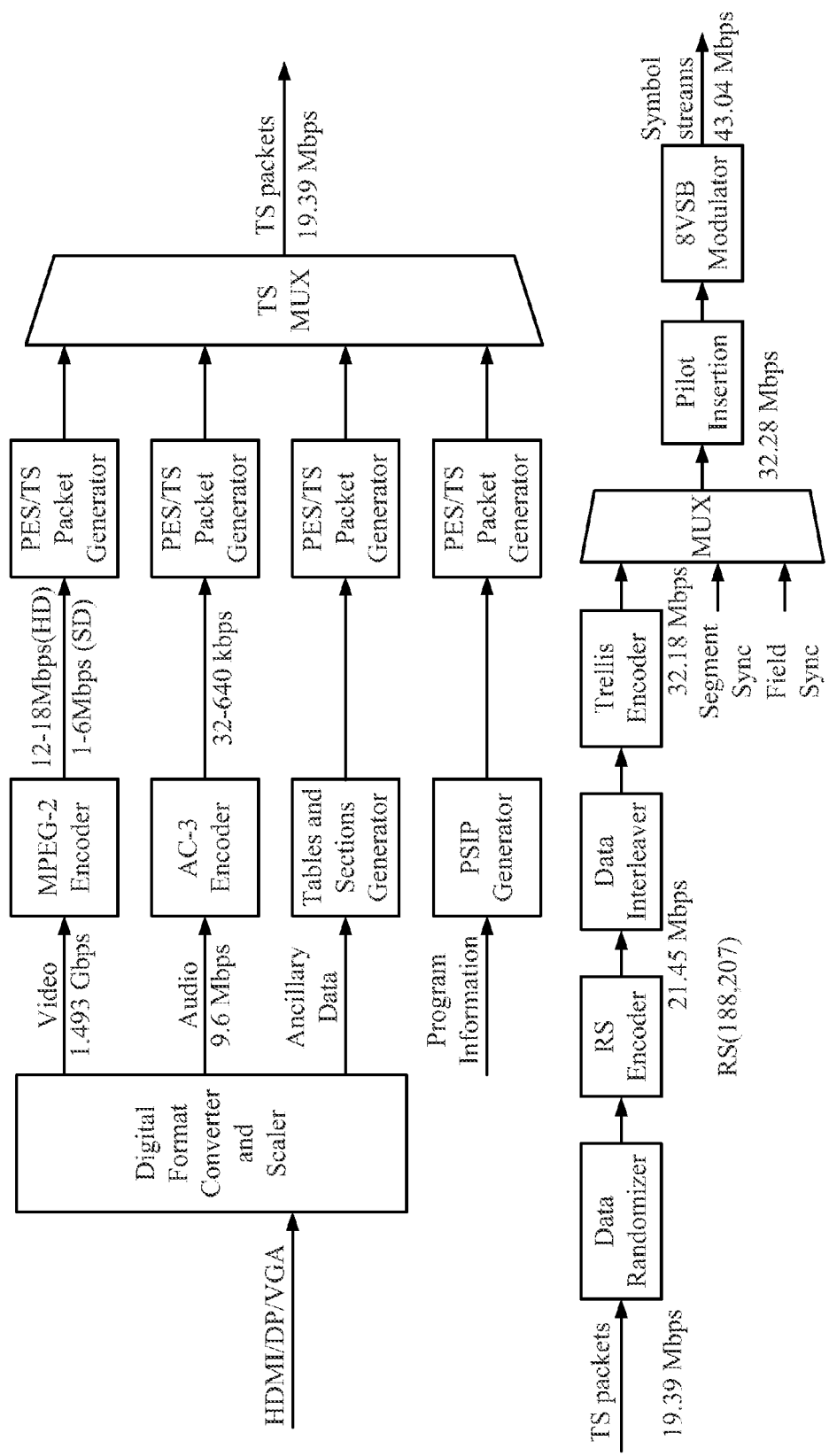
FIG. 5 is an illustration of an exemplary data flow for converting information (e.g., HDMI, DP, VGA, etc.) captured from user device into a MPEG-2 TS stream for transmission via ATSC white space band.
Figure 6:
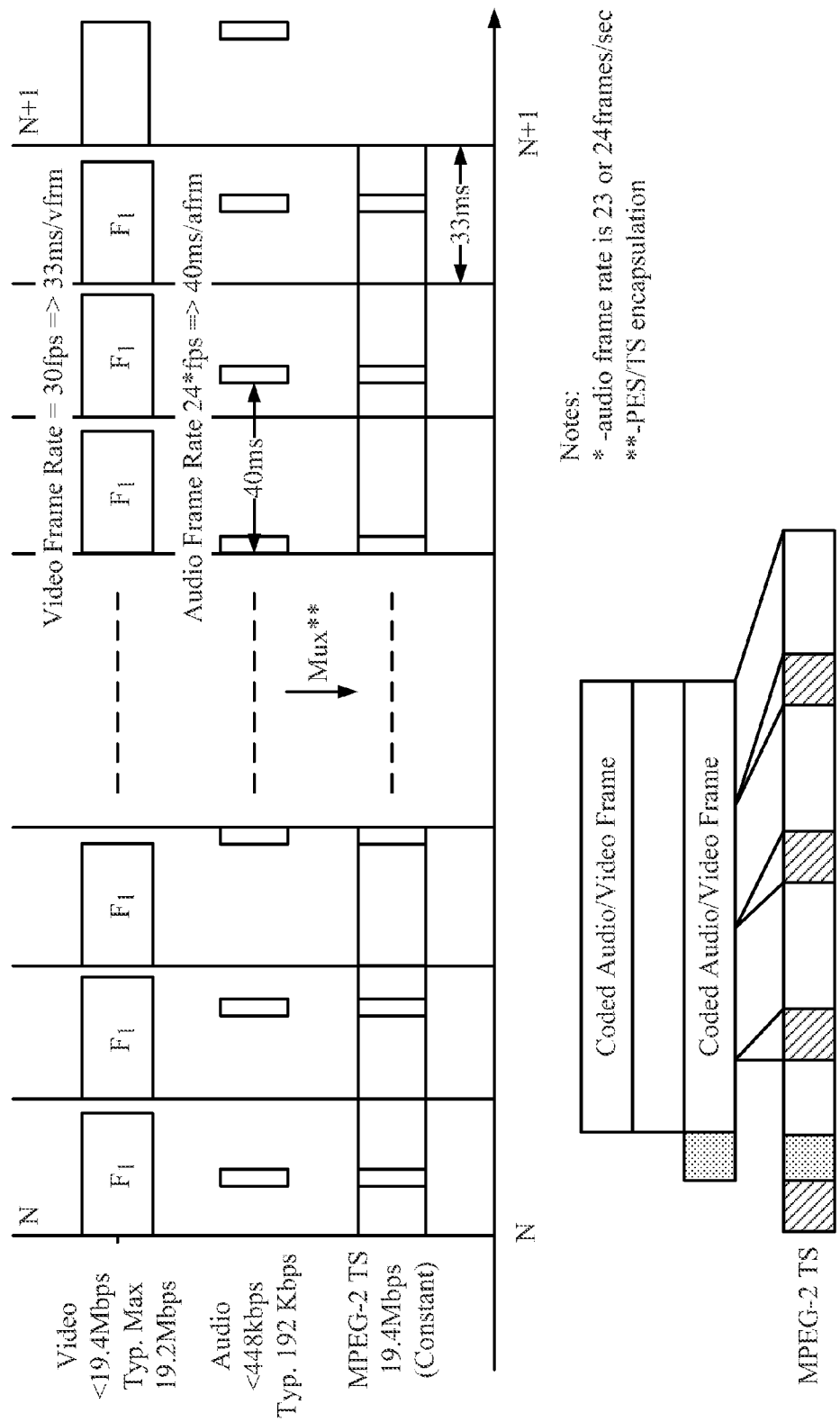
FIG. 6 is an illustration of typical ATSC data rates for video, audio, and for MPEG-2 TS streams.

As mentioned above, the exemplary white space device 102 may convert the information captured from user device 101 to a MPEG-2 TS stream for transmission, which is compatible with ATSC and thus can be received and processed by the ATSC receiver/tuner of display device 103. An exemplary data flow for converting information (e.g., HDMI, DP, VGA, etc.) captured from user device 101 into a MPEG-2 TS stream for transmission via ATSC white space band is shown in FIG. 5. Also, the typical ATSC data rates for video, audio, and for MPEG-2 TS streams are shown in FIG. 6.

Video and audio communication typically have a timing model in which the end-to-end delay from the signal input to an encoder to the signal output from a decoder is a constant. In ATSC, for instance, there is a strict timing model where the end-to-end delay from signal input to an encoder to the signal output from a decoder is constant. The end-to-end delay is the sum of delays encountered through the communication from a sender to a receiver, and may include such delays as encoding, encoder buffering, multiplexing, communication or storage, demultiplexing, decoder buffering, decoding, post-processing, and presentation delays. As part of the ATSC timing model, all video pictures and audio samples are presented exactly once.

Synchronization among multiple elementary streams is accomplished in ATSC (MPEG-2 TS) with use of Presentation Time Stamps (PTS) in the transport streams. Time stamps are generally in units of 90 kHz, but the System Clock Reference (SCR), the Program Clock Reference (PCR) and the optional Elementary Stream Clock Reference (ESCR) have extensions with a resolution of 27 MHz.

Figure 7:
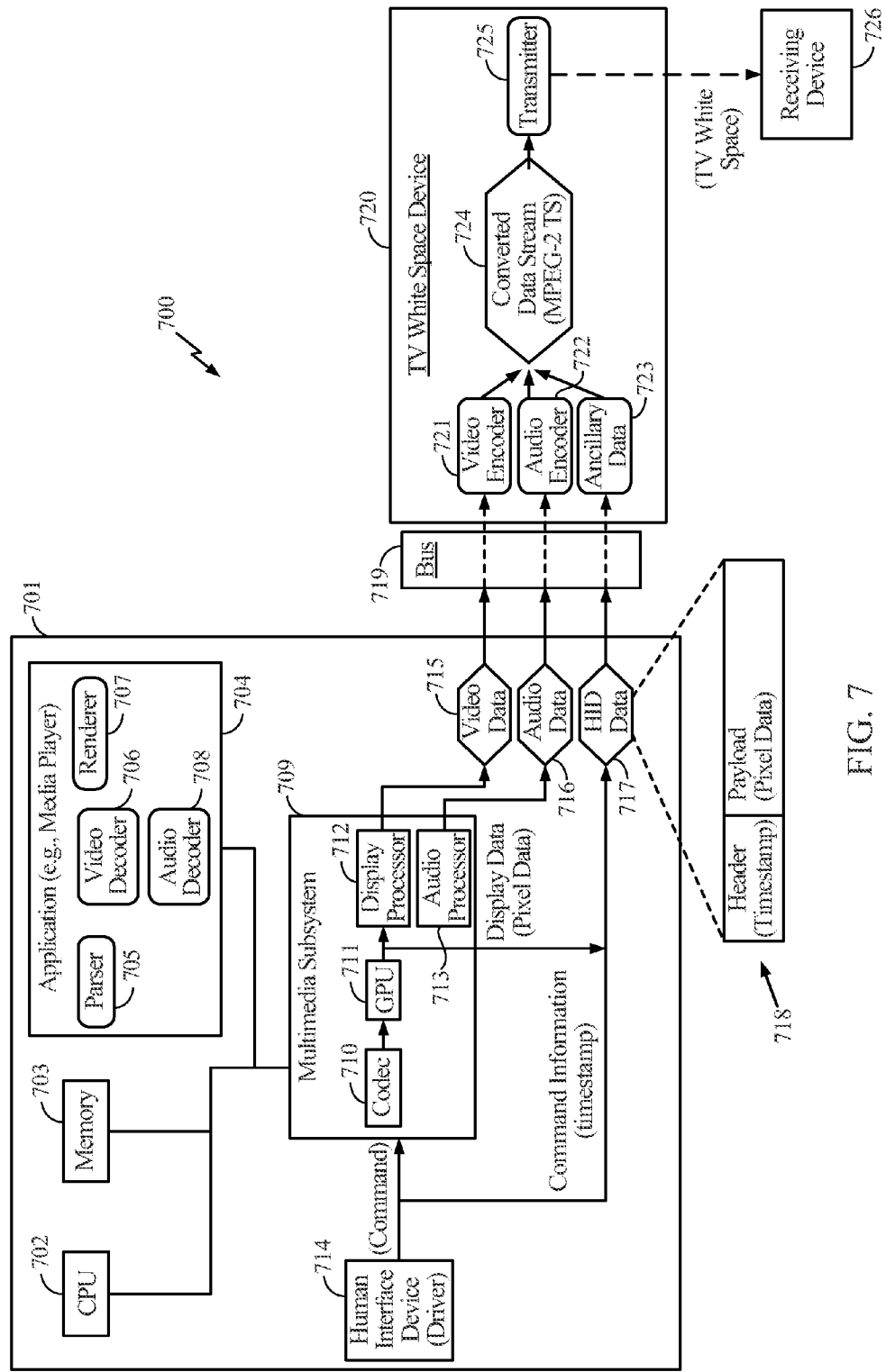
FIG. 7 is an illustration of another exemplary system within which aspects of the present disclosure may be implemented, which illustrates an exemplary aspect where human interface device (HID) data is captured from the user device and included as ancillary data within a transport stream generated by the white space device, in accordance with aspects of this disclosure.

FIG. 7 shows another exemplary system 700 within which aspects of the present disclosure may be implemented. System 700 is analogous to system 100 of FIG. 1, but includes blocks that are illustrated to aid the discussion of one exemplary aspect for using ancillary data to reduce latency. As in the exemplary system 100 of FIG. 1, system 700 includes a user device 701 (which may be the above-described user device 101), a white space device 720 (which may be the above-described white space device 102), and a receiving device 726 (which may be the above-described display device 103).

The exemplary user device 701 may include a central processing unit (CPU) 702, memory 703, and a multimedia subsystem 709. In the illustrated example, a software application 704, such as a media player application, is executing on the user device 701. The exemplary application 704 that is illustrated as executing in FIG. 7 includes a parser 705, video decoder 706, audio decoder 708, and renderer 707, and such application 704 may be executing to output multimedia content, such as a movie. Examples of such a media player application 704 include those applications commercially known as WINDOWS MEDIA PLAYER, WINAMP, REALPLAYER, QUICKTIME PLAYER, iTunes, AMAROK, ALLPLAYER, VLC, MPLAYER, XINE, TOTEM, etc.

The multimedia subsystem 709 may include a codec 710, graphics processing unit (GPU) 711, display processor 712, and audio processor 713. The multimedia subsystem 709 is employed to output video data 715 and/or audio data 716, as may be generated by application 704, for output to a display, speakers, or other output of user device 701 (not shown in FIG. 7). The user device 701 further includes one or more input devices (or "human interface devices") 714, such as mouse, keyboard, joystick, touch-screen interface, microphone, motion sensor, etc. The human interface device(s) ("HID") 714 may include a corresponding device driver executing on the user device 701.

The output payload content, such as video data 715 and audio data 716, is captured by white space device 720 via a communication interface or bus 719, such as a USB interface. white space device 720 is operable to process the captured information (e.g., to form it into a MPEG-2 TS stream) and transmit it, from transmitter 725, via TV white space for receipt by a receiving device 726, such as a HDTV device.

According to one aspect of the present disclosure, HID data 717 is also captured by white space device 720. In the illustrated example of FIG. 7, command information, such as timestamp information for an input command from a HID device 714, is captured as HID data 717. For instance, a pointer move command and corresponding timestamp may be captured from a mouse device, touchscreen interface, etc. In certain instances, a user input command may result in some output being generated or modified. For example, input of a user's mouse movement may result in corresponding movement of a pointer on an output display of the user device. Thus, corresponding display data from the GPU 711 may also be captured (e.g., as a still image, such as pixel data), which may also be included as HID data 717. An exemplary format for HID data 717 is shown as format 718, which includes a header portion that contains the captured command timestamp information and a payload portion that contains the captured pixel data.

In certain applications, such as video games or other applications where a delay in recognizing user input may impact operability of the application, it may be desirable to transmit the HID data 717 separately from the display data to avoid latency issues that may impact the transmission of display data from impacting transmission of the HID data 717. To address this, in one aspect, the white space device 720 captures the HID data 717 via an interface/bus 719, and white space device 720 processes the HID data 717 to include it as ancillary data 723 within a generated transport stream (e.g., within a MPEG-2 TS stream) 724. Thus, for instance, the white space device 720 includes a video encoder 721 for processing the captured video data 715, and the white space device 720 includes an audio encoder 722 for processing the captured audio data 716. The video and audio encoders process the captured video and audio data to generate a transport stream 724, such as an MPEG-2 TS (transport stream). In addition, the HID data is included in the generated stream 724 as ancillary data 723. The HID data 717 may be processed by the white space device 720 to generate ancillary data 723 that contains the payload data (e.g., pixel data), and the ancillary data 723 is embedded within the generated transport stream 724 at the proper time (e.g., relative to the other video and audio data) according to the timestamp included in the HID data 717. Additionally, position or location or coordinate information of the HID pixels in the frame associated with the display data may be communicated. The MPEG-2 TS can be transmitted by a transmitter 725.

In this manner, HID data 717 is separated from display data and transmitted as ancillary data 723 in the transport stream 724. Once received, the HID data 717 is processed (along with any timestamp information) by the white space device 720 and rendered to properly display on any display device. Separating HID data 717 in this manner may allow more responsive display on the display device 726 of user commands generated at the user device (e.g. moving a mouse pointer in an application or moving a target in a videogame) by transmitting HID data 717 separately from general video data 715.

As an example for one implementation, ATSC supports MPEG-2 TS, which permits ancillary data to be contained in a transmission. Such ancillary data is traditionally employed within ATSC/MPEG-2 TS communications for communicating closed-captioning information. Aspects of the present disclosure leverage such ancillary data to communicate information from a user device 701, such as HID data 717, efficiently. Thus, rather than merely relying upon transmission of HID information, such as mouse movements, as video frame data, such HID information may be more efficiently communicated as ancillary data 723 in accordance with certain aspects of the present disclosure.

The receiving device 726 may process the ancillary data, e.g., using a traditional ATSC receiver/tuner included therein, to overlay the received pixel data in its output. The ancillary data is relatively small in size, as compared with the video and audio data, and thus the ancillary data may be communicated more often and/or more efficiently. For instance, in one aspect, the ancillary data 723 may be embedded within the transport stream once every 77 microseconds. Accordingly, HID information, such as mouse movements, may be communicated efficiently, with extremely low delays (on the order of microseconds, rather than on the order of milliseconds as is possible in video stream data), to result in a good audiovisual experience for the user. For instance, the display changes resulting from user input of HID data, such as the movement of a pointer on a display resulting from the user's mouse movements, may be displayed at the receiving device 726 (e.g., an HDTV display) as a smooth movement that is output at an appropriate time, thereby making it easier for a user to interact with the application 704 and/or the content being output (via the HID device 714 of user device 701) while viewing the output on the receiving device 726.

Figure 8:
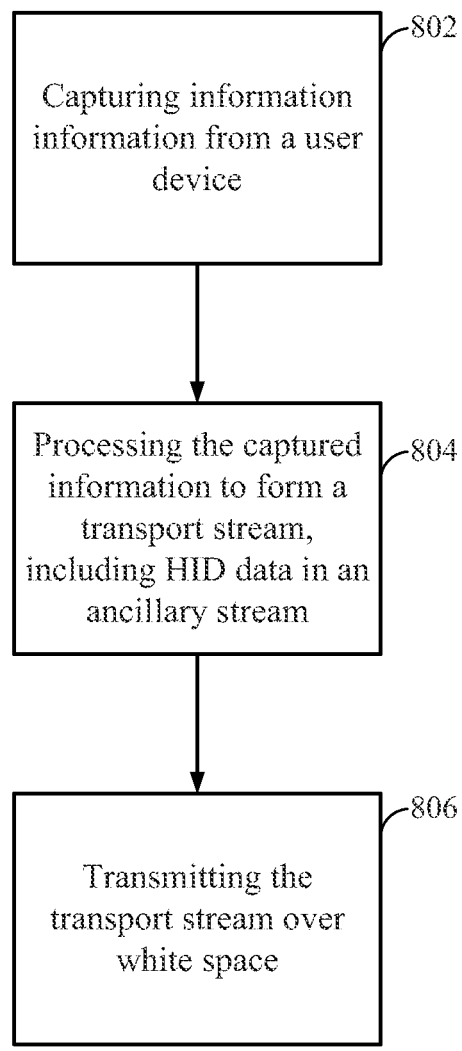
FIG. 8 illustrates transmission of user input data in white space according to one aspect of the present disclosure.

FIG. 8 illustrates transmission of user input data in white space according to one aspect of the present disclosure. As shown in block 802, a white space device in communication with a television receiver captures information from a use input device. As shown in block 804, the white space device then processes the captured information to form a transport stream for transmission over white space to the television receiver. At least a portion of the captured information is included as ancillary data within the transport stream. As shown in block 806, the white space device then transmits the transport stream over white space to the television receiver.

In one aspect an apparatus includes means for capturing information from a user input device, means for processing the captured information to form a transport stream, and means for transmitting the transport stream over white space to a television receiver. The device may also include means for capturing a timestamp for a user input command and means for capturing corresponding display data resulting from the user input command. In one aspect the aforementioned means may be a human interface device 714, multimedia subsystem 709, codec 710, GPU 711, HID data 717, bus 719, white space device 720, decoders 721 and/or 722, ancillary data 723, converted data stream 724, and/or transmitter 725.

Although the present disclosure and its advantages have been described in detail, it should be understood that various changes, substitutions and alterations can be made herein without departing from the technology of the disclosure as defined by the appended claims. Moreover, the scope of the present application is not intended to be limited to the particular aspects of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding aspects described herein may be utilized according to the present disclosure. Accordingly, the appended claims are intended to include within their scope such processes, machines, manufacture, compositions of matter, means, methods, or steps.

What is claimed is:

1. A method comprising:
  capturing, by a white space device in communication with a television receiver, video data displayed on a mobile user device in communication with the white space device, wherein the video data does not include any data for an object displayed on the mobile user device and associated with a mobile user input device;

capturing, by the white space device, human interface device (HID) information from the mobile user input device, the HID information comprising: pixel data corresponding to the object, and timestamp data including time and position of the object relative to the video data;

processing, by the white space device, the captured HID information and the video data to form a transport stream for transmission over white space to the television receiver, at least a portion of the captured HID information included as ancillary data within the transport stream, the ancillary data being in an elementary stream separate from the video data in the transport stream during transmission; and transmitting, from the white space device, the transport stream over white space to the television receiver.

2. The method of claim 1 in which capturing HID information further comprises capturing corresponding display data of the object.

3. The method of claim 2 in which the processing comprises:
including the corresponding display data as the ancillary data within the transport stream at a position in the transport stream determined based at least in part on the timestamp data.

4. The method of claim 3 in which the capturing further comprises capturing audio data being output on the user input device; and in which the processing comprises including the captured audio data in the transport stream.

5. The method of claim 1 in which the transport stream comprises a MPEG-2 TS (transport stream).

6. The method of claim 1 in which the ancillary data comprises ancillary data associated with captured multimedia or display data.

7. The method of claim 1, in which the HID information further comprises coordinates, within a frame of the video data, of the pixel data.

8. An apparatus comprising:
means for capturing, by a white space device in communication with a television receiver, video data displayed on a mobile user device in communication with the white space device, wherein the video data does not include any data for an object displayed on the mobile user device and associated with a mobile user input device;
means for capturing, by the white space device, human interface device (HID) information from the mobile user input device, the HID information comprising: pixel data corresponding to the object, and timestamp data including time and position of the object relative to the video data;
means for processing, by the white space device, the captured HID information and the video data to form a transport stream for transmission over white space to the television receiver, at least a portion of the captured HID information included as ancillary data within the transport stream, the ancillary data being in an elementary stream separate from the video data in the transport stream during transmission; and
means for transmitting the transport stream over white space to the television receiver.

9. The apparatus of claim 8 in which the means for capturing HID information further comprises means for capturing corresponding display data of the object.

10. The apparatus of claim 8, in which the HID information further comprises coordinates, within a frame of the video data, of the pixel data.

11. A non-transitory computer-readable medium having program code recorded thereon, the program code comprising:
program code to capture, by a white space device in communication with a television receiver, video data displayed on a mobile user device in communication with the white space device, wherein the video data does not include any data for an object displayed on the mobile user device and associated with a mobile user input device;
program code to capture, by the white space device, human interface device (HID) information from the mobile user input device, the HID information comprising: pixel data corresponding to the object, and timestamp data including time and position of the object relative to the video data;
program code to process the captured HID information and the video data to form a transport stream for transmission over white space to the television receiver, at least a portion of the captured HID information included as ancillary data within the transport stream, the ancillary data being in an elementary stream separate from the video data in the transport stream during transmission; and
program code to transmit the transport stream over white space to the television receiver.

12. The non-transitory computer-readable medium of claim 11 in which the program code to capture HID information further comprises program code to capture corresponding display data of the object.

13. The non-transitory computer-readable medium of claim 11, in which the HID information further comprises coordinates, within a frame of the video data, of the pixel data.

14. An apparatus comprising:
at least one processor; and
a memory coupled to the at least one processor, the at least one processor being configured:
to capture, by a white space device in communication with a television receiver, video data displayed on a mobile user device in communication with the white space device, wherein the video data does not include any data for an object displayed on the mobile user device and associated with a mobile user input device;
to capture, by the white space device, human interface device (HID) information from the mobile user input device, the HID information comprising: a payload comprising pixel data corresponding to the object, and timestamp data including time and position of the object relative to the video data;
to process the captured HID information and the video data to form a transport stream for transmission over white space to the television receiver, at least a portion of the captured HID information included as ancillary data within the transport stream, the ancillary data being in an elementary stream separate from the video data in the transport stream during transmission; and
to transmit the transport stream over white space to the television receiver.

15. The apparatus of claim 14 in which the at least one processor is further configured to capture HID information by capturing corresponding display data of the object.

16. The apparatus of claim 15 in which the at least one processor is configured to process by including the corresponding display data as the ancillary data within the transport stream at a position in the transport stream determined based at least in part on the timestamp data.

17. The apparatus of claim 16 wherein the capturing further comprises capturing audio data being output on the user input device; and in which the processing comprises including the captured audio data in the transport stream.

18. The apparatus of claim 14 in which the transport stream comprises a MPEG-2 TS (transport stream).

19. The apparatus of claim 14 in which the user input device comprises a portable device.

20. The apparatus of claim 14 in which the ancillary data comprises ancillary data associated with captured multimedia or display data.

21. The apparatus of claim 14, in which the HID information further comprises coordinates, within a frame of the video data, of the pixel data.

22. A system comprising:
- a white space device communicatively coupled with a mobile user device for capturing:
  - video data displayed on the mobile user device in communication with the white space device, wherein the video data does not include any data for an object displayed on the mobile user device and associated with a user input device, and
  - human interface device (HID) information from the user input device, the HID information comprising: pixel data corresponding to the object, and timestamp data including time and position of the object relative to the video data,
- the white space device comprising:
  - a processor that processes the captured HID information and the video data to form a transport stream for transmission over white space, at least a portion of the captured HID information included as ancillary data within the transport stream, the ancillary data being in an elementary stream separate from the video data in the transport stream during transmission; and
  - a transmitter that transmits the transport stream over white space.

23. The system of claim 22, in which the HID information further comprises coordinates, within a frame of the video data, of the pixel data.

* * * * *